(12) United States Patent
Kim et al.

(10) Patent No.: US 8,044,975 B2
(45) Date of Patent: Oct. 25, 2011

(54) APPARATUS AND METHOD FOR PROVIDING WALLPAPER

(75) Inventors: Soon-Ok Kim, Mapo-gu (KR);
Chan-Woo Park, Jongno-gu (KR);
Kyu-Ok Choi, Yongsan-gu (KR);
Do-Hwan Choi, Gangnam-gu (KR);
Jong-Hyun An, Songpa-gu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 869 days.

(21) Appl. No.: 12/006,466

(22) Filed: Jan. 3, 2008

(65) Prior Publication Data

US 2008/0186332 A1    Aug. 7, 2008

(30) Foreign Application Priority Data

Jan. 10, 2007   (KR) .................. 10-2007-0002996

(51) Int. Cl.
*G09G 5/00*        (2006.01)
*G06F 17/00*       (2006.01)
*G06T 13/00*       (2011.01)

(52) U.S. Cl. ........ 345/634; 345/418; 345/629; 345/473; 345/474

(58) Field of Classification Search ............ 345/418, 345/629, 473, 474, 156, 633, 634; 715/864; 455/466
See application file for complete search history.

(56) References Cited

U.S. PATENT DOCUMENTS

| | | | |
|---|---|---|---|
| 7,050,783 B2 | 5/2006 | Curtiss et al. | |
| 2004/0117727 A1* | 6/2004 | Wada | 715/500 |
| 2007/0113181 A1* | 5/2007 | Blattner et al. | 715/706 |
| 2007/0250591 A1* | 10/2007 | Milic-Frayling et al. | 709/217 |
| 2007/0287477 A1* | 12/2007 | Tran | 455/466 |
| 2008/0039212 A1* | 2/2008 | Ahlgren et al. | 455/3.01 |
| 2009/0309711 A1* | 12/2009 | Adappa et al. | 340/501 |
| 2010/0156907 A1* | 6/2010 | VanderSpek et al. | 345/156 |
| 2010/0207871 A1* | 8/2010 | Reponen et al. | 345/156 |
| 2010/0214243 A1* | 8/2010 | Birnbaum et al. | 345/156 |

FOREIGN PATENT DOCUMENTS

| | | |
|---|---|---|
| KR | 20-0266509 | 2/2002 |
| KR | 1020030086003 A | 11/2003 |
| KR | 1020060004108 A | 1/2006 |
| KR | 1020060006622 A | 1/2006 |
| KR | 1020060031092 A | 4/2006 |
| KR | 1020070041882 A | 4/2007 |
| KR | 1020070058105 A | 6/2007 |

\* cited by examiner

*Primary Examiner* — Chante Harrison

(57) ABSTRACT

Disclosed are an apparatus and a method for providing a wallpaper. To this end, a current state of a mobile terminal is detected, particle images and fluid image reflecting the detected current state of the mobile terminal are generated, and the generated particles and the generated fluid are displayed on a preset wallpaper so as to generate a wallpaper. Then, user motion is detected, acceleration and movement amount are extracted from the detected user motion, and movement amounts and movement directions of the particles and the fluid are determined based on the extracted acceleration and movement amount. Then, the particles and fluid are displayed in reflection of the gravity on movement amounts and movement directions of particles and fluid. Accordingly, it is possible to provide a wallpaper having an effect as if an actual snow globe is moved.

17 Claims, 6 Drawing Sheets

APPARATUS AND METHOD FOR PROVIDING WALLPAPER

CROSS-REFERENCE TO RELATED APPLICATION(S) AND CLAIM OF PRIORITY

This application claims the benefit under 35 U.S.C. §119(a) of an application entitled "Apparatus and Method for Providing Wallpaper" filed in the Korean Industrial Property Office on Jan. 10, 2007 and assigned Ser. No. 2007-0002996, the contents of which are hereby incorporated by reference.

TECHNICAL FIELD OF THE INVENTION

The present invention relates to a mobile terminal, and more particularly to a wallpaper accessory displayed in a mobile terminal.

BACKGROUND OF THE INVENTION

In general, a mobile terminal includes various terminals such as a Personal Digital Assistant (PDA) and a portable telephone. With the rapid development of technology of such a mobile terminal, it satisfies a user's demand for higher performance, smarter appearance, and a display screen.

Therefore, a current mobile terminal can display various wallpapers at a user's request. For example, a user may set an image of the user's face or lover's face to be used for the wallpaper, or may set images of animations repeatedly showing a specific action to be used for the wallpaper.

However, in the conventional wallpaper display technology of the mobile terminal, only still images or the above-described animations repeatedly showing only a specific action has been used. Accordingly, in the conventional wallpaper display technology, it is possible to display only insignificant and simple images and is impossible to display images in reflection of current states of mobile terminal or user motion occurring when a user shakes or reverses the mobile terminal as in a case of a snow globe.

Herein, the snow globe refers to a toy for decoration, which includes liquid similar to water within a glass sphere (that is, fluid), small snow-shaped particles within the fluid, and decoration characters such as a Christmas tree or a doll. Therefore, when a user shakes this glass sphere, the snow-shaped particles and the fluid are shaken according to the user movement, so that it is possible to provide an effect as if the shapes of the shaken particles and fluid are similar to those of the actually falling snow.

A general snow globe has the advantage of the excellent decoration effect, but lacks portability. This is because the snow globe is heavy and fragile due to inclusion of the glass sphere and the fluid, so that a user is requested to carefully handle it. Therefore, although the snow globe has an excellent decoration effect, it is difficult to use the snow globe for the decoration of a mobile terminal.

SUMMARY OF THE INVENTION

To address the above-discussed deficiencies of the prior art, it is a primary object of the present invention to provide an apparatus and a method for providing a wallpaper in a mobile terminal, which can achieve a wallpaper having an effect similar to that of an actual snow globe.

Also, the present invention provides an apparatus and a method for providing a wallpaper in a mobile terminal, which enables a snow globe wallpaper to be displayed in refection of current states of a mobile terminal.

In accordance with an aspect of the present invention, there is provided an apparatus for providing a wallpaper in a mobile terminal, the apparatus including: a memory module for storing images of a preset basic frame; a terminal state detection module for detecting at least one state of the mobile terminal; a display module for displaying a generated fluid image and generated particle images by including an image generation module for generating the fluid image and the particle images reflecting a detected result of the mobile terminal; a motion detection module for detecting a movement amount and a movement direction of the mobile terminal; and a controller for controlling the image generation module so that a wallpaper is generated based on the images of the basic frame, and the fluid image and the particle images are generated to be displayed within the basic frame, setting image movement amounts and image movement directions of the particle images and the fluid image according to a result detected by the motion detection module, and controlling the display module so that the fluid image and the particle images are configured to move according to the set movement amounts and the set movement directions.

In accordance with another aspect of the present invention, there is provided a method for providing a wallpaper in a mobile terminal, the method including the steps of: generating a background image by using images of a preset basic frame; generating particle images and a fluid image reflecting at least one state of the mobile terminal; displaying the generated particle images and the generated fluid image within the basic frame; detecting a movement amount and a movement direction of the mobile terminal; setting image movement amounts and image movement directions of the particle images and the fluid image according to the detected movement amount and movement direction; and reflecting the set image movement amounts and image movement directions on the particle images and the fluid image so that the particle images and the fluid image can move according to the set image movement amounts and the set image movement directions.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile terminal.

First, the basic principle of the present invention will be described to help its complete understanding. According to the present invention, both particle images (hereinafter, referred to as "particles") and a fluid image (hereinafter, referred to as "fluid") of a wallpaper are generated in reflection of current states of a mobile terminal detected by a terminal state detection module for detecting the current states of the mobile terminal, and then the generated particles and fluid are displayed on a preset wallpaper in order to generate a wallpaper. Then, acceleration and a movement direction are extracted from user motion detected by a motion detection module for detecting motion of a user, and movement amounts and movement directions of the particles and fluid are determined based on the extracted acceleration and movement direction. A state of the wallpaper is detected by comparing the current preset absolute gravity direction with the lower limit of the current displayed wallpaper, and the gravity influence is reflected on the movement amounts and the movement directions of the particles and fluid, and thus the particles and fluid are displayed. Therefore, a mobile terminal according to an embodiment of the present invention can display a wallpaper having an effect similar to that of an actual snow globe. Herein, the basic frame may include various shapes (e.g. a round shape, a polygon, or a snow globe-like shape) set according to the user's selection.

Figure 1:
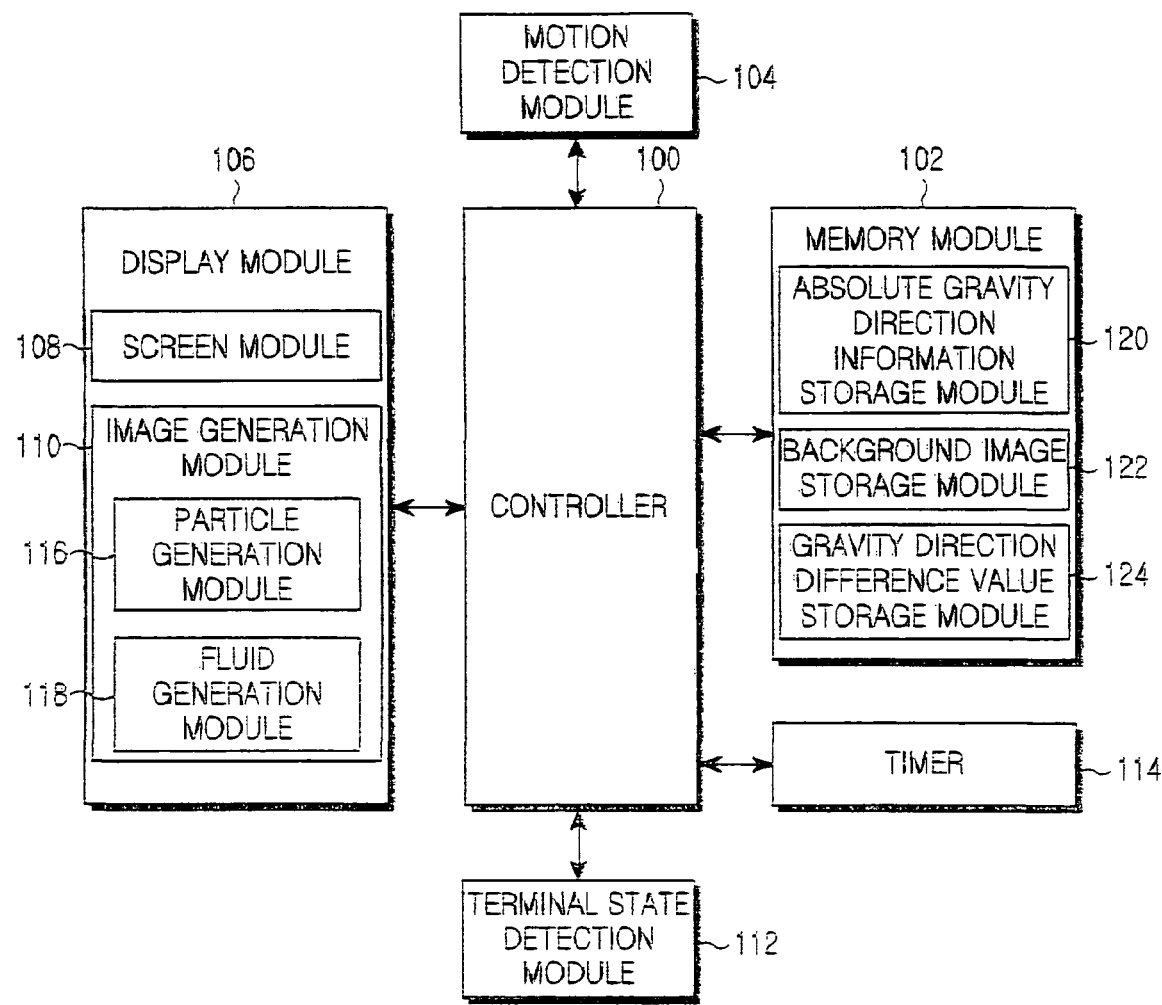
FIG. 1 is a block diagram illustrating constructions of an apparatus for providing a wallpaper according to an embodiment of the present invention.
Figure 2:
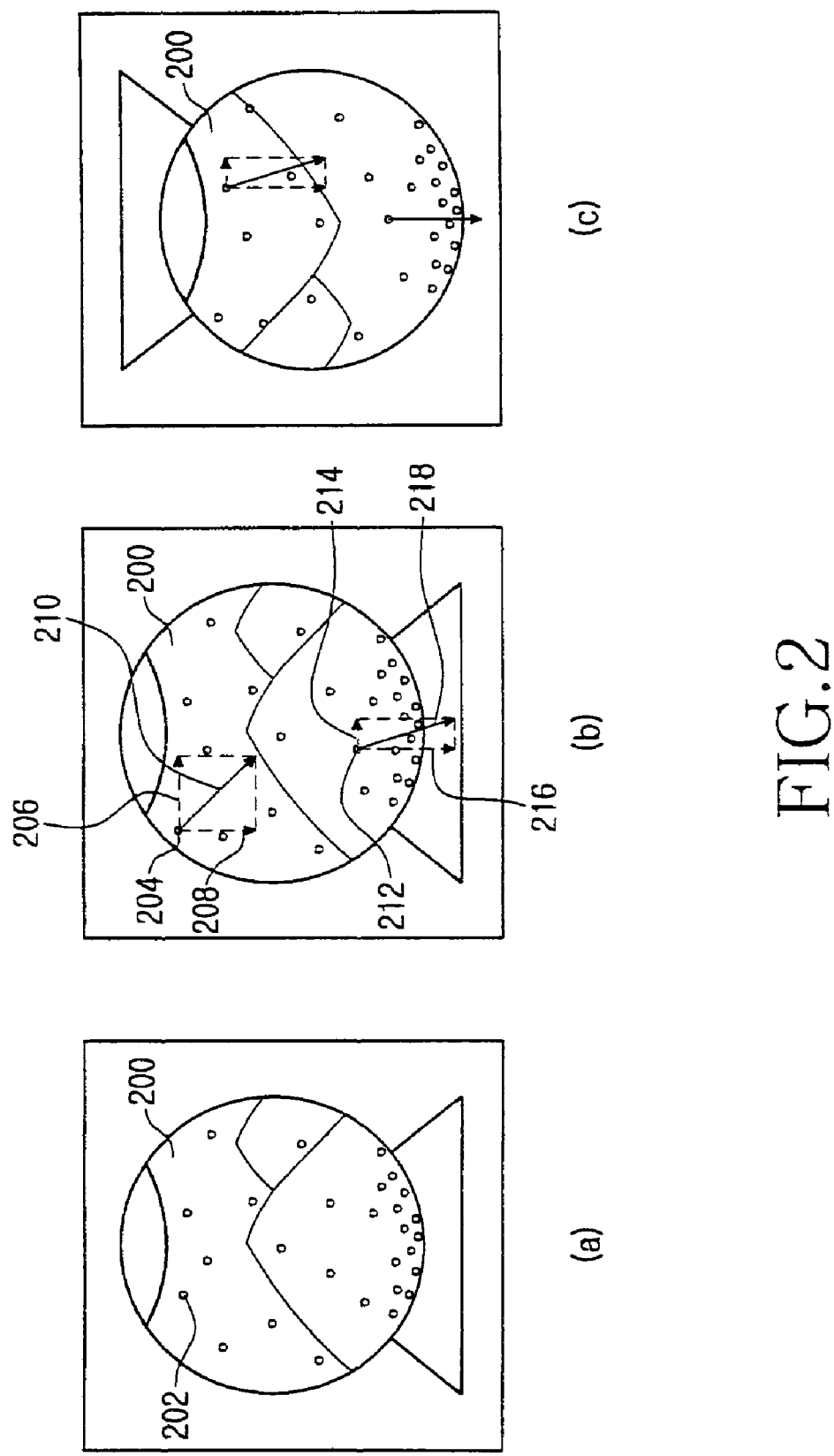
FIGS. 2A to 2C illustrate examples where a snow globe wallpaper is displayed in an apparatus for providing a wallpaper according to an embodiment of the present invention.

FIG. 1 is a block diagram illustrating constructions of an apparatus for providing a wallpaper of a mobile terminal according to an embodiment of the present invention.

Referring to FIG. 1, the apparatus for providing a wallpaper according to the present invention includes a controller 100, and a memory module 102, a display module 106, a terminal state detection module 112, a motion detection module 104, and a timer 114, which are connected to the controller 100.

Herein, the display module 106 includes a screen module 108 for displaying a wallpaper according to the control of the controller 100, and an image generation module 110 for generating background image information and displaying particles and fluid contained in the background image on the screen module 108. Herein, the image generation module 110 includes construction modules for generating particles and fluid, which are essential Each construction elements required for the above-described snow globe. of the construction modules is called a particle generation module 116 and a fluid generation module 118. Herein, the particle generation module 116 and the fluid generation module 118 can differently generate the number of particles and the amount of the fluid according to the control of the controller 100. The image generation module 110 controls both the movements of the particles generated from the particle generation module 116 and the movement of the fluid generated from the fluid generation module 118 under the control of the controller 100.

Then, the terminal state detection module 112 detects current states of a mobile terminal including an apparatus for providing a wallpaper according to the embodiment of the present invention. For example, the terminal state detection module 112 can detect the current remaining battery power of the mobile terminal, the amount of the phone calls of the current user, the total number of current received messages, the number of the addresses stored in the current address book, the reception sensitivity of current calls, empty spaces in a memory, and usage frequency of a memory. Further, the terminal state detection module 112 can detect current residual time from a preset alarm time when the alarm has been set. Furthermore, the terminal state detection module 112 can also detect if an indicating event is generated. For example, the indicating event may correspond to the occurrence of unconfirmed messages, the notification of calls on absence, or the notification of low battery power. When such an indicating event is generated, a general mobile terminal notifies the user of the occurrence of the indicating event through a letter envelope-shaped icon or a telephone-shaped icon, which corresponds to each of specific indicating events.

The terminal state detection module 112 can only detect specific indicating events and mobile terminal states for one or more items having been preset by a mobile terminal manufacturer or a user, without having to detect all the mobile terminal states. In this case, the terminal state detection module 112 detects the preset states and indicating events, and thus applies the detected results to the controller 100.

When motion including movement or rotation occurs in the apparatus for providing a wallpaper according to the embodiment of the present invention, the motion detection module 104 detects the motion of the apparatus and then calculates information for the movement direction and acceleration of the current detected motion. Such a motion detection module 104 may include an acceleration sensor, or a Gyro sensor for measuring movement directions, etc., in order to calculate the movement directions and the acceleration. In addition, the motion detection module 104 may include a gravity sensor for detecting the gravity direction and the gravity influence in order to provide effects caused by gravity in the wallpaper.

The controller 100 controls respective constructions within the apparatus for providing a wallpaper according to a preset protocol. When a wallpaper is selected, under the control of the controller 100, the image generation module 110 sets the wallpaper selected by a user to be used for a preset background and generates particles and fluid based on a detection result of the terminal state detection module 112. Therefore, the particles and fluid included in the wallpaper according to the embodiment of the present invention reflect the current states of the mobile terminal. For example, the particles and fluid can reflect the current remaining battery power of the mobile terminal. In this case, when the current remaining battery power is 75%, a glass sphere, only 75% of which is filled with fluid, may be displayed in the wallpaper. Also, only 75% of a preset maximum number of particles may be generated and displayed.

In addition, each of the particles and fluid may be set to reflect mutually different states of mobile terminals. For example, the particles may be generated in reflection of the number of the current received messages of the mobile terminal, and the fluid may be generated in reflection of the remaining battery power as described above. When the terminal state detection module 112 detects that an indicating event is currently generated, the controller 100 controls the particle generation module 116 so that one or more particles can be changed into icon shapes according to the current generated indicating event, and then the icon-shaped particles can be displayed.

Moreover, the controller 100 checks if there is motion detected by the motion detection module 104. When the motion is detected, the movement amount and movement direction calculated by the motion detection module 104 are reflected on the particles and the fluid. Herein, the controller 100 detects the current gravity influence direction according to a display state of the current wallpaper, and reflects the detected gravity influence on the calculated movement amount and movement direction, thereby setting the movement amounts and movement directions of the particles and the fluid. The controller 100 controls the image generation module 110 in order to display the particles and fluid, which move according to the set movement amounts and the set movement directions.

Also, the controller 100 may check an amount of time set for the movement of each of the current generated particles and fluid by the timer 114. In this case, by gradually decreasing the movement amounts of the particles and fluid by the detected motion according to the amount of time checked by the timer 114, it is possible to express gradual decrement of the movement amount due to motion of the user according to the passage of time, thereby achieving a more realistic snow globe effect.

The memory module 102 connected with the controller 100 includes a Read Only Memory (ROM), a Flash memory, a Random Access Memory (RAM), etc. The memory module 102 stores various reference data and programs for processing and controlling of the controller 100. Further, the memory module 102 provides a working memory of the controller 100 and an updatable storage space for various storage data.

Such a memory module 102 includes a storage space storing both images of a basic frame and images of the wallpaper within the basic frame, in order to generate the preset wallpaper. Hereinafter, such a storage space is referred to as a background image storage module 122. Herein, the background image storage module 122 stores various images including images of a round shape, a polygon, or a snow globe-like shape, which are to be used for images of the basic frame. The memory module 102 may store information regarding the current set absolute gravity direction. Hereinafter, a storage space of the memory module 102 storing the information about such an absolute gravity direction is referred to as an absolute gravity direction information storage module 120.

Herein, the absolute gravity direction is a value stored to always indicate a preset specific direction (e.g. gravity direction), even if a location and a wallpaper display state are changed by the movement or the rotation of the mobile terminal. For example, when the motion detection module 104 is provided with a gravity sensor for detecting the gravity, a gravity direction detected from the corresponding motion detection module 104 may correspond to the above-described absolute gravity direction.

Also, a user may reverse or rotate a mobile terminal in a state where the wallpaper is displayed. In this case, the apparatus for providing the wallpaper according to the embodiment of the present invention detects that the current wallpaper displayed direction is changed. To this end, the apparatus for providing the wallpaper calculates a difference value between the current set absolute gravity direction and the current wallpaper displayed direction, stores the calculated difference value, determines if this difference value is changed, and thus determines if the current wallpaper displayed direction is changed, according to a result of the determination in a change of the difference value. When the display direction is changed, the movements of particles and fluid according to the current gravity direction are displayed. To this end, the memory module 102 of the apparatus for providing the wallpaper according to the embodiment of the present invention includes a storage space for storing the difference value between the absolute gravity direction and the current wallpaper displayed direction, which is referred to as a gravity direction difference value storage module 124.

Therefore, the apparatus for providing the wallpaper according to the embodiment of the present invention generates a wall paper having an image set by a user to be used for the background, and then currently detects a variety of the preset states of the mobile terminal including the apparatus for providing the wallpaper, thereby displaying particles and fluid reflecting the detected states on the wallpaper. Moreover, the apparatus for providing the wall paper reflects both the movement amount and movement direction extracted from the motion detected by the motion detection module 104 and the gravity influence on the particles and the fluid, thereby displaying the movements of particles and the fluid to be similar to those of the particles and fluid of an actual snow globe. Therefore, the wallpaper according to the embodiment of the present invention can not only provide an excellent decoration effect like an actual snow globe, but also provide a user with enjoyment due to the snow globe effects.

FIGS. 2A to 2C show examples where a snow globe wallpaper is displayed in the apparatus for providing the wallpaper according to the embodiment of the present invention.

First, referring to FIG. 2A, the apparatus for providing the wallpaper according to the embodiment of the present invention synthesizes a background image set by a user within a basic frame shaped like a preset snow globe, and then generates and displays fluid 200 and particles 202 on the background image. Although the particles 202 are expressed to have a snow shape in FIG. 2A, the particles may be either expressed to have a star shape or expressed by an icon corresponding to a generated indicating event, instead of having the snow shape.

In this case, when a user moves a mobile terminal including the apparatus for providing the wallpaper, (e.g. when a user shakes the mobile terminal from side to side), the apparatus for providing the wallpaper calculates information for the movement amount and movement direction from the motion that is currently detected by the motion detection module 104. Then, the motion detection module 104 reflects both the current set absolute gravity direction and force magnitude according to the current set absolute gravity direction (i.e. gravity magnitude) on the calculated movement amount and movement direction, and then determines movement amounts and movement directions of the particles 202 and the fluid 200.

FIG. 2B shows an example where the absolute gravity direction and force magnitude are reflected on the current calculated movement amount and movement direction as described above. The particle indicated by reference numeral 204 in FIG. 2B corresponds to an example based on an assumption that the movement amount and movement direction detected from user's motion are represented by a motion vector 206 and both the absolute gravity direction and the force magnitude set according to the absolute gravity direction are represented by a gravity vector 208. In this case, the motion detection module 104 finally determines a movement amount and a movement direction for the particle indicated by the reference numeral 204 by using a resultant vector 210 corresponding to resultant force of the motion vector 206 and the gravity vector 208. Therefore, the particle indicated by the reference numeral 204 is moved according to the resultant vector 210, within the wallpaper.

Furthermore, in a case of an actual snow globe, when particles scatter through the user motion such as the shaking of the snow globe, the movements of corresponding particles are gradually decreased according to the passage of time, and the particles are finally piled up on the bottom of the glass sphere of the snow globe. In order to implement the above-described effect, as shown in FIG. 2B, the apparatus for providing the wallpaper detects the amount of time taken for each movement of the current generated particles through the timer 114, decreases movement amounts, which are calculated by motion, according to the detected amount of time value, thereby setting mutually different movement amounts according to the location for each of the particles.

For example, it can be noted that, since the particle indicated by the reference numeral 212 is located lower than the particle indicated by the reference numeral 204, it has taken the longer time from the start of falling of the particle indicated by the reference numeral 212 than that of the particle indicated by the reference numeral 204. Therefore, when the particle corresponding to the reference numeral 214 initially starts to move, the apparatus for providing the wallpaper checks the time elapsed since then through the timer 114, and the apparatus decreases the current set movement amount every the preset time when the movement amount of the current detected particle is not zero. Therefore, even if the movement amount according to the user motion is constantly applied, the motion vectors 206 and 214 have mutually different magnitudes as in a case of particles corresponding to the reference numerals 212 and 204 shown in FIG. 2B. Moreover, the resultant vectors 210 and 218 determining final movement of particles have mutually different magnitudes according to a change in the motion vector.

Although it has been assumed in FIG. 2B that a particle located at the lower end have fallen for a longer time, the present invention is not limited to that assumption. That is, when a user moves the mobile terminal, influence by the user movement affects all particles. Therefore, even if a particle is located at the lower end of the wallpaper, the particle may not be one having fallen for a longer time. However, a particle corresponding to the reference numeral 212 is close to the lower limit of a wallpaper basic frame, so that the particle does not move any more when reaching the wallpaper lower limit. However, a particle corresponding to the reference numeral 204 is farther from the lower limit, so that the particle falls for a longer time. In this case, the particle corresponding to the reference numeral 204 has the magnitude of motion vector 206 gradually decreased according to movement start time.

Meanwhile, a user may reverse a mobile terminal including the apparatus for providing the wallpaper according to the embodiment of the present invention, as in the case of an actual snow globe. In this case, the apparatus for providing the wallpaper determines if there is a change in a difference value between a current wallpaper displayed direction and a current set absolute gravity direction, thereby detecting the reversed state. Then, the apparatus displays the particles and fluid 200 moving in a direction based on the absolute gravity direction.

FIG. 2C shows an example of a snow globe wallpaper according to the embodiment of the present invention. Referring to FIG. 2C, when a user reverses the mobile terminal, the apparatus for providing the wallpaper detects that there is a change in the difference value between the current wallpaper displayed direction and the absolute gravity direction, and then displays the fluid 200 to move according to the current absolute gravity direction. Therefore, bubbles of the fluid 200 are displayed and are located in a direction different from those of FIGS. 2A and 2B. In this case, the particles are displayed to move based on the absolute gravity direction and the force magnitude according to the absolute gravity direction, as shown in FIG. 2C. When a user reverses a mobile terminal without shaking it, some motion due to the reversed direction may also be detected by the motion detection module 104. Therefore, in this case, the movement amount and movement direction of the particle are determined based on a resultant force direction, which is affected by the detected motion and the gravity direction. Therefore, the apparatus for providing the wallpaper can generate a wallpaper capable of providing an effect similar to that of an actual snow globe.

Figure 3:
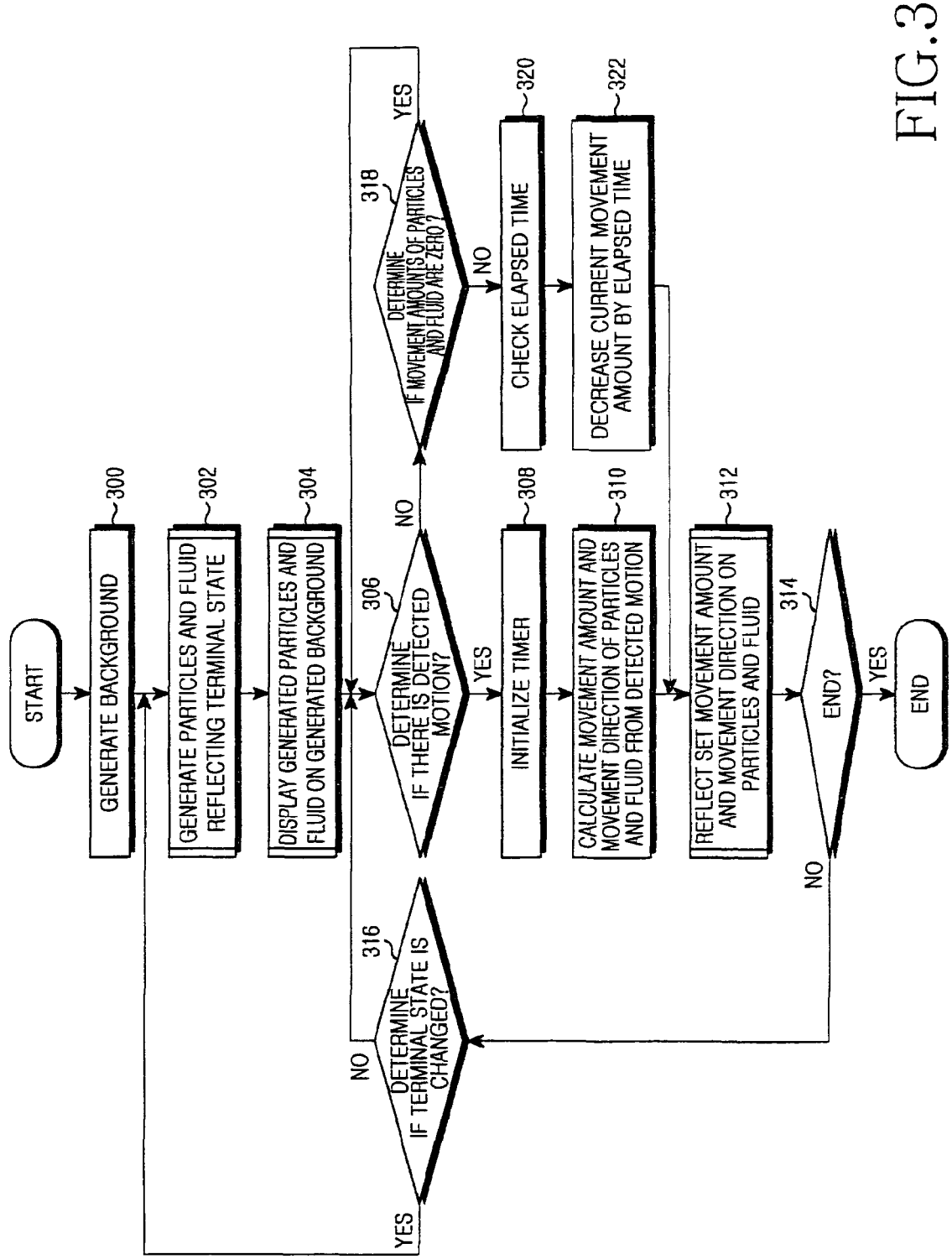
FIG. 3 is a flow diagram illustrating an operation of displaying a wallpaper in an apparatus for providing a wallpaper according to an embodiment of the present invention.

FIG. 3 is a flow diagram showing an operation of displaying the wallpaper in the apparatus for providing the wallpaper according to the embodiment of the present invention. In the following description, it is assumed that the apparatus for providing the wallpaper is included in a specific mobile terminal.

Referring to FIG. 3, when a wallpaper display is selected, the controller 100 of the apparatus for providing the wallpaper proceeds to step 300 in which the controller generates a wallpaper, having an image selected by a user to be used for the background, within the current set basic frame image. The controller 100 proceeds to step 302 in which the controller 100 detects the current state of the mobile terminal and generates particles and fluid reflecting the detected state.

Herein, the detected state of the mobile terminal may include the remaining battery power, the amount of the calls of the current user, the total number of current received messages, the number of the addresses stored in a current address book, and the reception sensitivity of current calls. Also, the particles and fluid may reflect mutually different states of the mobile terminal, as described above.

Figure 4:
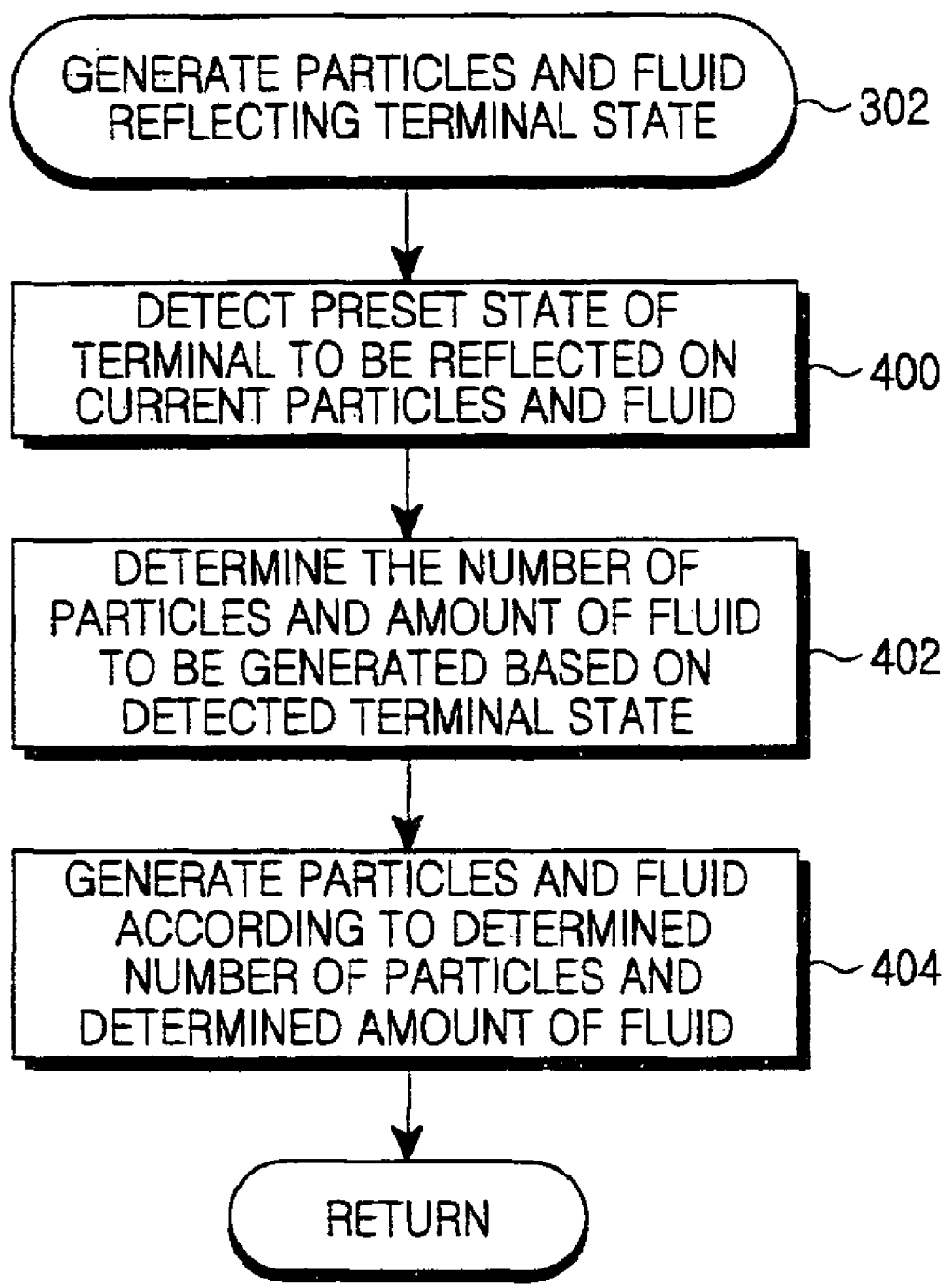
FIG. 4 is a detailed flow diagram illustrating a process of generating particles and fluid, during a process of displaying a wallpaper in an apparatus for providing a wallpaper according to an embodiment of the present invention.

FIG. 4 is a detailed flow diagram illustrating a process of generating particles and fluid reflecting states of a mobile terminal in the apparatus for providing the wallpaper according to the embodiment of the present invention.

Referring to FIG. 4, the controller 100 proceeds to step 400 in which the controller 400 detects predefined states of the terminal to reflect the detected state on current particles and fluid through the terminal state detection module 112. Then, the controller 100 determines the number of particles or the amount of fluid (i.e. size of a fluid image) so that the detected results can be reflected on the particles and fluid according to the detection result of the terminal state detection module 112. For example, in this case, when the number of the particles is set to reflect a ratio of the number of current stored messages with respect to the total capacity of the message storage module (not shown) of the mobile terminal, and the amount of the fluid is set to reflect current remaining battery power of the mobile terminal, the controller 100 calculates a ratio of the number of current stored messages with respect to the total capacity of the message storage module, and then determines the number of the preset particles to correspond to the calculated ratio. Then, the controller 100 checks the current amount of the battery, and then determines the amount of the fluid according to the remaining battery power amount.

In step 404, the controller 100 generates particles and fluid according to the determined number of the particles and the determined amount of the fluid. Therefore, the user of the mobile terminal can easily recognize the current state of the mobile terminal through the current displayed wallpaper.

Meanwhile, when the particles and fluid are generated in step 302, the controller 100 proceeds to step 304 in which the controller 100 displays the particles and fluid, which move based on the movement amounts and movement directions set for the current particles and fluid, through the image generation module 110.

Figure 5:
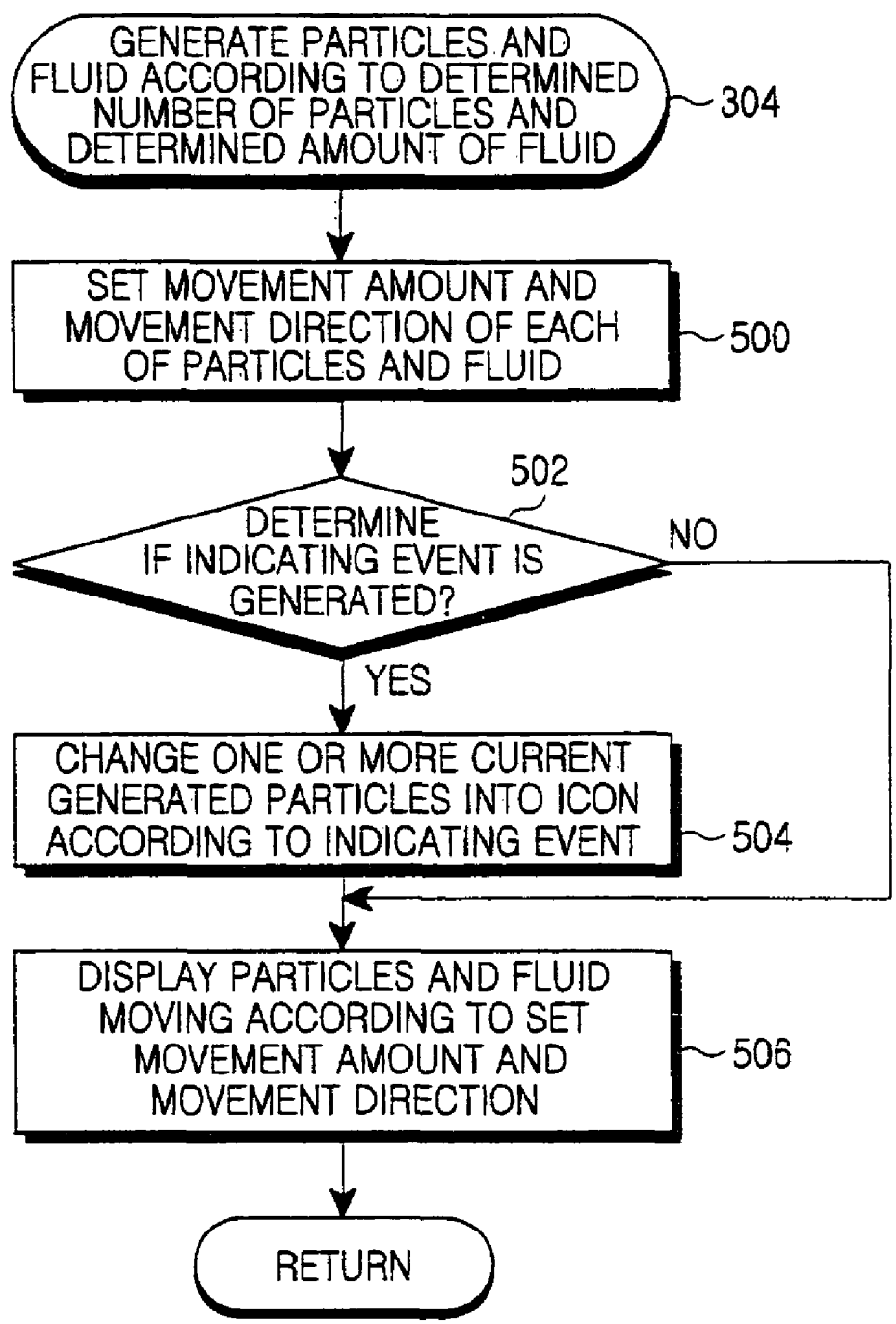
FIG. 5 is a flow diagram illustrating an operation process based on a case where one or more particles are changed into an indicating icon in an apparatus for providing a wallpaper according to an embodiment of the present invention.

When an indicating event is generated in the middle of displaying the wallpaper, as described above, it is possible to display an icon, corresponding to the current generated indicating event, instead of the particles. FIG. 5 is a detailed flow diagram illustrating an operation process of step 304 according to an embodiment where one or more particles are changed into an indicating icon in the apparatus for providing the wallpaper when the indicating event is generated in the middle of displaying the wallpaper.

Referring to FIG. 5, the controller 100 proceeds to step 500 in which the controller 100 sets the current set movement amounts and movement directions for each of the current generated particles and the current generated fluid. Herein, when the controller 100 currently detects user motion, the controller 100 sets movement amounts and movement directions based on the influences of corresponding motion and gravity. However, when the controller 100 does not detect user motion, the controller 100 sets movement amounts and movement directions of the particles and fluid based on only an influence of gravity.

The controller 100 proceeds to step 502 in which the controller 100 checks if an indicating event is generated. As described above, the indicating event refers to an event for reporting either a specific state change or information to a user, when the specific state change or the information to be reported to a user is generated (e.g. occurrence of unconfirmed messages, notification of calls on absence, notification of low battery power, etc).

As a result of the checking in step 502, when the indicating event is generated, the controller 100 proceeds to step 504, in which the controller 100 changes one or more current generated particles into icons corresponding to the current generated indicating event. Then, some of the current generated particles are changed into the icons. Then, the particles, changed into the indicating icons, maintain a state of being changed icons until the alarm of the indicating event is released. Herein, the alarm release of the indicating event means that the current generated indicating event is released. For example, when a user confirms unconfirmed messages or notification of calls on absence, or replaces little remaining battery with a new battery, it is possible to release such an indicating event. It is of course possible to generate multiple indicating events as well as a single indicating event at one time point. In this case, the controller 100 can change the particles into icons corresponding to a plurality of indicating events by individually performing step 504 for each of the indicating events.

The controller 100 proceeds to step 506 in which the controller 100 controls the image generation module 110 so that particles and fluid moving based on the movement amount and movement direction set for each of the current particles and the current fluid are displayed on the screen module 108 of the display module 106.

Meanwhile, when particles and fluid are displayed on the wallpaper through the processes shown in FIG. 4 or FIG. 5, or through step 304 of FIG. 3, the controller 100 proceeds to step 306, in which the controller 100 checks if there is currently detected motion. As a result of the detection in step 306, when there is detected motion, the controller 100 proceeds to step 308, in which the controller 100 initializes the timer 114. In step 310, the controller 100 calculates movement amounts and movement directions of the particles and fluid from the motion detected in step 306. In step 312, the controller 100 reflects the movement amount and movement direction, calculated from the current detected motion, on the particles and fluid currently being displayed based on the current set gravity influence.

However, as a result of the determination in step 306, when there is no detected motion, the controller 100 proceeds to step 318 in which the controller 100 checks if the movement amount of the current particles and the current fluid is zero. When the movement amount of the particles and fluid is not zero, the controller 100 proceeds to step 320 in which the controller 100 checks the time, having elapsed after the movement amount and movement direction due to motion detected in step 306 is set for each of the particles and the fluid, by the timer 114. In step 322, the controller 100 decreases the current set movement amounts for each of the particles and the fluid according to the motion detected in step 306 (e.g. the motion vector as shown in FIG. 2B) by an amount corresponding to the elapsed time. In step 312, the controller 100 reflects the movement amount and movement direction, calculated from the current detected motion, on the particles and fluid being displayed according to the current set gravity influence.

As a result of checking in step 318, when the movement amount of the particles and fluid is zero, the controller 100 returns to step 306 in which the controller 100 detects if there is motion detected from the user, again. Herein, the controller 100 detects if the movement amount of the particles and fluid is zero, in order to check if the particles and fluid do not move. That is, in a case of the particles, even if the controller does not detect the user motion, they have the movement amounts and movement directions due to gravity. Therefore, when the movement amount of the particles is zero, all particles reach the upper limit or the lower limit of the wallpaper, so that they cannot move to a down direction any more. Moreover, when the movement amount of the fluid is zero, the controller 100 does not detect motion from a user, so that the movement amount (i.e. motion vector magnitude) is gradually decreased according to passage of time, and the movement amount becomes zero. In this case, the controller 100 returns to step 306 in which the controller checks if there is motion detected from the user.

In step 312, the controller 100 reflects the movement amount and movement direction, calculated from the current detected motion, on the particles and fluid currently being displayed based on the currently set gravity influence. As described above, the reflection of the gravity influence on the particles and fluid is as in the case of FIG. 2B. Also, the controller 100 may include a process of determining if the current wallpaper is reversed. In this case, an operation process of the step 312 will be described in more detail with reference to FIG. 6.

After reflecting the current set movement amount and movement direction on the particles and fluid based on the current set gravity influence in step 312, the controller 100 proceeds to step 314 in which the controller 100 checks if a user stops displaying a wallpaper. As a result of the checking in step 314, when the user selects stopping of the current wallpaper display, the controller 100 stops displaying the wallpaper. However, when the user does not select the stopping of the current wallpaper display, the controller 100 proceeds to step 316, in which the controller 100 checks if the preset state of the mobile terminal is changed to reflect the current set movement amount and movement direction on the current particles and fluid.

As a result of the checking in step 316, when the preset state of the mobile terminal is changed, the controller 100 proceeds to step 302 in which the controller 100 generates particles and fluid reflecting a current detected state of the mobile terminal. In step 302, the controller 100 may generate more particles according to the detected state of the mobile terminal, or the controller 100 may stop displaying some of the current generated particles. In step 304, the controller 100 sets the movement amounts and movement directions of the current generated particles based on the current set movement amount and movement direction, and displays the particles to move according to the set movement amounts and movement directions.

However, as a result of the checking in step 316, when the preset state of the mobile terminal is not changed, the controller 100 proceeds to step 304 in which the controller 100 controls the image generation module 110 so that the particles and fluid moving based on the preset movement amount and movement direction can be displayed on the wallpaper. Then, the controller 100 performs steps 308 to 312 or performs steps 318 to 322 and step 312 according to the result of the determination in step 306, and the controller 100 returns to step 314 in which the controller 100 repeatedly performs the above-described steps. Therefore, the apparatus for providing the wallpaper in the embodiment of the present invention can provide an excellent decoration effect comparable to an actual snow globe by generating a wallpaper similar to an actual snow globe. In addition, the apparatus for providing the wallpaper reflects states of a mobile terminal (e.g. occurrence of indicating events) on particles, thereby more easily reporting a current state of the mobile terminal to a user.

Figure 6:
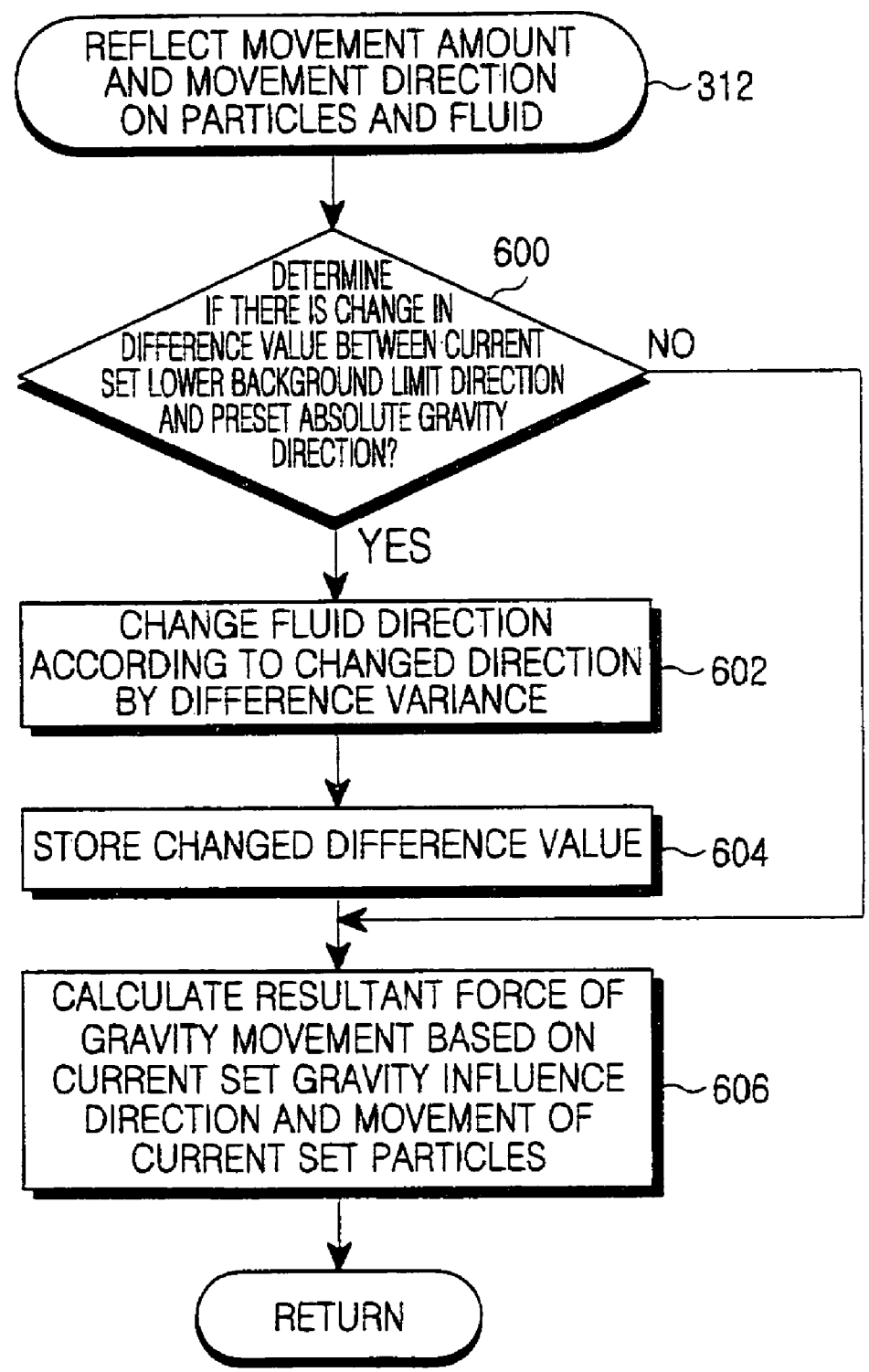
FIG. 6 is a detailed flow diagram illustrating an operation process of determining the movement amounts and the movement directions of particles in an apparatus for providing a wallpaper according to an embodiment of the present invention.

FIG. 6 is a detailed flow diagram illustrating an operation process of determining the movement amounts and the movement directions of particles in the apparatus for providing the wallpaper according to an embodiment of the present invention.

Referring to FIG. 6, the controller 100 proceeds to step 600, in which the controller 100 checks if there is a change in the difference value between a direction of a currently set lower background limit and a preset absolute gravity direction. As a result of the checking in step 600, when there is no change in the difference value between the direction of a currently set lower background limit and the preset absolute gravity direction, the controller 100 directly proceeds to step 606, in which the controller 100 calculates resultant force of gravity movement amount based on the current set gravity influence direction (e.g. gravity vector) and the movement amount of the current set particles (e.g. motion vector). Then, the controller 100 proceeds to step 314 of FIG. 3, in which the controller 100 checks if the displaying wallpaper is stopped. According to a result of checking in step 314, the controller 100 stops displaying the wallpaper or the controller 100 proceeds to step 316, in which the controller 100 checks if the current preset state of the mobile terminal is changed.

However, as a result of the checking in step 600, when there is a change in the difference value between the direction of a currently set lower background limit and the preset absolute gravity direction, the controller 100 determines that the current wallpaper has been rotated from the previous wallpaper. Then, the controller 100 proceeds to step 602 in which the controller 100 changes a current direction of the fluid according to the changed direction. For example, when fluid displayed within a basic frame in the apparatus for providing the wallpaper is displayed within the basic frame in reflection of a current specific state of a mobile terminal, the basic frame may include one part filled with fluid and another part not filled with fluid. For example, when current remaining battery power is ¾, a glass sphere in the wallpaper is displayed as having been filled with fluid only up to ¾ of the glass sphere from the lower limit, so that a user can notify that current remaining battery power is ¾. In this case, the rest empty ¼ portion of the glass sphere may be displayed as having been filled with bubbles.

In a case of an actual snow globe, bubbles are always located in a direction opposite to gravity. Therefore, when the controller 100 of the apparatus for providing the wallpaper determines that the wallpaper is rotated in step 602, the controller 100 changes the generated bubble direction by the rotated angle (i.e. by a difference value between the wallpaper lower limit direction and the preset absolute gravity direction), thereby providing an effect as if an actual snow globe is rotated.

The controller 100 proceeds to step 604, in which the controller 100 stores the current calculated difference value. Then, the controller 100 proceeds to step 606, in which the controller 100 calculates resultant force of gravity movement amount due to the current set gravity influence direction (e.g. gravity vector) and the movement amount of the current set particles (e.g. motion vector). Therefore, the particles are displayed to fall toward the upper limit instead of the lower limit of the wallpaper.

Therefore, when the wallpaper is upside down, the apparatus for providing the wallpaper according to the embodiment of the present invention reflects the changed state, thereby moving particles and fluid according to the changed state. That is, the apparatus for providing the wallpaper can provide a decoration effect comparable to an actual snow globe.

While the invention has been shown and described with reference to certain exemplary embodiments thereof, it will be understood by those skilled in the art that various changes in form and details may be made therein without departing from the spirit and scope of the invention as defined by the appended claims. Particularly, although it has been assumed in the above description of embodiments of the present invention that an image selected by a user is used for a background image of a wallpaper, it is also possible to change the background image according to user selection without limitation even if a wallpaper is currently being displayed. Moreover, the particles used in the detailed description of the present invention can have various shapes including a snow-like shape as well as a star-like shape. Accordingly, the scope of the invention is not to be limited by the above embodiments but by the claims and the equivalents thereof.

Therefore, the present invention can provide a wallpaper having an excellent decoration effect similar to that of an actual snow globe. Moreover, the present invention can reflect current states of a mobile terminal on the snow globe wallpaper, thereby providing an excellent decoration effect and more easily reporting the current mobile terminal state to a user.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for providing a wallpaper in a mobile terminal, the apparatus comprising:
    a memory module configured to store images of a preset basic frame;
    an image generation module configured to generate a fluid image and particle images;
    a display module configured to display the fluid image and particle images;
    a motion detection module configured to detect a movement amount and a movement direction of the mobile terminal;
    a gravity sensor configured to detect a direction of current gravity; and
    a controller configured to control the image generation module to generate a wallpaper based on the images of the basic frame with the fluid image and the particle images displayed within the basic frame, set an image movement amount and an image movement direction of the particle images according to a result detected by the motion detection module, and control the display module to display the fluid image and the particles images such that the particle images move according to the set movement amount and the set movement direction,
    wherein the controller is configured to set the image movement amount and the image movement direction of the particle images by reflecting a detected gravity direction on at least one of the movement amount and the movement direction calculated based on the result detected by the motion detection module, and to control the display module to move the particle images according to the set image movement amount and the image movement direction.

2. The apparatus as claimed in claim 1, wherein the images of the basic frame include at least one of a round-shaped image, a polygon-shaped image, and a snow globe-shaped image.

3. The apparatus as claimed in claim 1, further comprising a terminal state detection module configured to detect at least one state of the mobile terminal,
    wherein the terminal state detection module is configured to detect at least one of a remaining battery power of the mobile terminal, an amount of phone calls of a current user, a total number of current received messages, a number of addresses stored in a current address book, a reception sensitivity of current calls, an available amount of memory space, a usage frequency of the memory space, a current residual time in a preset alarm time, and an occurrence of an indicating event.

4. The apparatus as claimed in claim 3, wherein the indicating event includes one of a notification of an unconfirmed message reception, a notification of calls on absence, and a notification of low battery power.

5. The apparatus as claimed in claim 3, wherein the controller is configured to control the image generation module to reflect different states of the mobile terminal on the particle images and the fluid image.

6. The apparatus as claimed in claim 3, wherein the controller is configured to control the image generation module to change one or more of the particle images into an icon corresponding to the indicating event when the indicating event is generated.

7. The apparatus as claimed in claim 1, wherein the controller is configured to determine if the wallpaper is rotated, and then to change a fluid image display direction when the wallpaper has rotated.

8. The apparatus as claimed in claim 7, wherein the controller is configured to compare the fluid image display direction with the detected gravity direction, thereby detecting if the wallpaper is rotated, according to a result of the comparison.

9. The apparatus as claimed in claim 1, further comprising a timer configured to check an amount of time set for the image movement amounts and the image movement directions for each of the fluid and particle images.

10. The apparatus as claimed in claim 9, wherein the controller is configured to check the amount of time set for the image movement amount and the image movement direction of each of the particle images, and to decrease the image movement amount according to the amount of time.

11. A method for providing a wallpaper in a mobile terminal, the method comprising:
    generating a background image using images of a preset basic frame;
    generating particle images and a fluid image;
    displaying the generated particle images and the generated fluid image within the basic frame;
    detecting a movement amount and a movement direction of the mobile terminal;
    setting an image movement amount and an image movement direction of the particle images according to the detected movement amount and movement direction of the mobile terminal; and
    reflecting the set image movement amount and the set image movement direction on the particle images such that the particle images move according to the set image movement amount and the set image movement direction,
    wherein the image movement amount and the image movement direction are set by reflecting a gravity direction on at least one of the detected movement amount and movement direction, and
    the particle images are moved according to the set image movement amount and the set image movement direction.

12. The method as claimed in claim 11, wherein the basic frame includes one of a round shape, a polygon, and a snow globe-like shape.

13. The method as claimed in claim 11, wherein generating particle images and a fluid image comprises:
    detecting one or more preset states of the mobile terminal in order to reflect a detected state on the particle images and the fluid image;
    determining a number of the particle images and a size of the fluid image according to a result of the state detection; and
    generating the particle images and the fluid image according to the determined size of the fluid image and the determined number of the particle images.

14. The method as claimed in claim 13, wherein displaying the generated particle images and the generated fluid image further comprises:
    detecting an indicating event; and
    changing one or more of the generated particles into an icon corresponding to the indicating event when the indicating event is generated.

15. The method as claimed in claim 11, further comprising:
checking an amount of time set for the image movement amount of the particle images; and
decreasing the image movement amount according to the amount of time.

16. The method as claimed in claim 11, further comprising:
determining if the background image is rotated; and
changing a display direction of the fluid image by a rotated angle of the background image when the background image is rotated.

17. The method as claimed in claim 16, wherein determining if the background image is rotated comprises:
calculating a difference value between a preset gravity direction and a lower limit of a current direction of the background image;
determining if there is a difference between the calculated difference value and a pre-stored difference value; and
determining that the background image is rotated, when there is the difference between the calculated difference value and the pre-stored difference value.

* * * * *